(12) United States Patent
Imai

(10) Patent No.: US 6,560,650 B1
(45) Date of Patent: May 6, 2003

(54) COMPUTER SYSTEM FOR CONTROLLING A DATA TRANSFER

(75) Inventor: Isao Imai, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/349,486

(22) Filed: Jul. 9, 1999

(30) Foreign Application Priority Data

Feb. 25, 1999 (JP) .......................................... 11-047331

(51) Int. Cl.[7] .............................................. G06F 13/00
(52) U.S. Cl. ...................................... 709/227; 709/217
(58) Field of Search .............................. 709/200, 201, 709/203, 217, 218, 219, 223, 224, 227, 228, 229

(56) References Cited

U.S. PATENT DOCUMENTS 6,119,161 A * 9/2000 Iita et al. ..................... 709/227

6,304,637 B1 * 10/2001 Mirashrafi et al. ......... 379/88.17

FOREIGN PATENT DOCUMENTS

| JP | A10-149325 A | 6/1998 |
| JP | 10155040 A | 9/1998 |

* cited by examiner

Primary Examiner—Moustafa M. Meky
(74) Attorney, Agent, or Firm—Birch, Stewart, Kolasch & Birch, LLP

(57) ABSTRACT

When a failure is occurred in the Internet or a connection between a computer system and an Internet provider, a reconnection is performed automatically, and data are resent. Hence, a restoring operation can be made easily. Further, even when long data are re-transferred, a reliability can be ensured. When a receiving computer and the Internet provider are disconnected and reconnected, a sending computer receives an old IP address and a new IP address of the receiving computer, and compares the received old IP address and an old IP address stored in a connection information storage. When the IP addresses are matched, the data are re-transferred to the receiving computer by using the received new IP address.

1 Claim, 19 Drawing Sheets

Fig. 3

| | SENDING COMPUTER | RECEIVING COMPUTER | |
|---|---|---|---|
| ADDRESS | 133.141.13.110 | 202.226.45.130 | 3001 |
| PORT NO. | 5001 | 5001 | 3002 |

Fig. 7

| PROVIDER INFO. | | PERSONAL INFO. | |
|---|---|---|---|
| TEL. NO. | DNS SERVER | USER NAME | PASSWORD |
| 0467-xx-xxxx | dns.prov1.ne.jp | isl | ******* |
| 03-xx-xxxx | proxy.prov2.ne.jp | melco | ******* |

| PRIORITY | CONTENT |
|---|---|
| 1 | RETURN ARR. CONF. MESS. IN EVERY PAC. RECEIPT |
| 2 | SET REPLY FREQ. OF ARR. CONF. MESS. BASED ON HISTORY INFO. |
| 3 | RETURN AN ARR. CONF. MESS. AFTER REC. xx PAC. |
| 4 | RETURN AN ARR. CONF. MESS. AFTER REC. ALL PAC. |

1701         1702

COMPUTER SYSTEM FOR CONTROLLING A DATA TRANSFER

BACKGROUND OF THE INVENTION

1. Field of the Invention

This invention relates to a system for controlling a data transfer between computers connected each other through a public telephone line by dialing up. Particularly, this invention relates to a system for controlling the data transfer, which can manage a failure occurred during a transmission processing.

2. Description of the Related Art

Basically, there are two methods for connecting the computer to the Internet, i.e., a method for connecting the computer through the public telephone line by dialing up and a method for connecting the computer through a leased line.

In the method for connecting the computer by dialing up, the computer is not always connected to a network, e.g., the Internet, etc. When it is necessary, the computer is connected to the network through the public telephone line. Therefore, when a transmission data amount and a number of transmissions are small, this method is cheaper than the method using the leased line. Recently, this method is more adopted in a remote monitoring and controlling system of a small factory, etc.

A method related to this invention is disclosed in "A Direct Function Program between Internet users according to an IP Address Switching and its System," in Japanese Unexamined Published Patent Application Hei 10-149325.

FIG. 18 illustrates a configuration of a transmission system between computers connected each other by dialing up according to the related art.

In FIG. 18, a server function program 1801 is provided in the Internet. The server function program 1801 manages IP (Internet protocol) addresses and current conditions of end-users centrally, who have logged in the Internet. In a side of the end-users of the Internet, client function programs 1802a and 1802b are provided. The client function program of the end-user sends its own IP address and current condition to the server function program 1801, and receives an IP address of another end-user, with which the end-user wants to communicate, from the server function program 1801.

According to this method, the client function programs 1802a and 1802b of the end-users, who have logged in the Internet, send their own IP addresses and current conditions to the server function program 1801 respectively. The client function programs 1802a and 1802b receive current IP addresses of other end-users from the server function program 1801 to connect to the other end-users directly, and send the current IP addresses to dialogue transmission systems 1804a and 1804b. Accordingly, the end-users can be connected each other directly, and a transmission processing can be realized.

A method related to this invention is also disclosed in "A Calling Method of a Transmission Apparatus Connected by Dialing Up and its Monitoring and Controlling System," in Japanese Unexamined Published Patent Application Hei 10-155040.

FIG. 19 illustrates a configuration of a transmission system between computers connected each other by dialing up according to the related art.

In FIG. 19, each of transmission apparatuses 1902 and 1903 including connectors, computers, and telephones are connected to a telephone line 1904. The transmission apparatuses 1902 and 1903 are connected to Internet providers 1905 and 1906 via the telephone line 1904 respectively, and the Internet providers 1905 and 1906 are connected each other via Internet 1907.

According to this method, the transmission apparatus 1902 calls the transmission apparatus 1903 via the telephone line 1904, and sends a request for connecting to the transmission apparatus 1903. Then, both of the transmission apparatuses 1902 and 1903 disconnect the telephone line 1904 once. Then, the transmission apparatuses 1902 and 1903 call neighboring Internet providers 1905 and 1906, and connect to the Internet 1907 respectively. The transmission apparatuses 1902 and 1903 send their own IP addresses to e-mail addresses each other by e-mails. When both of the transmission apparatuses 1902 and 1903 confirm the IP addresses each other, both of the transmission apparatuses 1902 and 1903 can process the transmission by using the IP addresses in the Internet 1907.

SUMMARY OF THE INVENTION

According to the related art, the processing is performed as stated in the transmission system between the computers connected each other by dialing up. However, since a recovery processing from a failure is not considered, when a failure is occurred in the network during a transmission processing, the processing between the computers must be suspended, and restarted from a beginning of the processing.

Further, when a transmission apparatus and an Internet provider are disconnected due to a failure between the computers connected by dialing up, a user has to perform a troublesome operation for reconnecting.

Further, when the transmission is processed by using the Internet, possibilities of a loss of a packet and a transmission failure tend to increase in proportion to an increase of a data size of transmission data. Since a size of data transmitted between the computers is not considered according to the related art, when a transmission of data in a long size is processed, a reliability of the transmission can not be guaranteed.

Accordingly, it is an object of this invention to solve the above-stated problems in the related art. Even if a failure is occurred in the network, the processing can be continued by using a provided data retransmission function.

It is another object of this invention to reconnect to the Internet automatically in case that the connection to the Internet provider is disconnected by providing a provider information manager for managing connection information to the Internet provider.

It is also another object of this invention to ensure a reliability in a transmission processing of a long packet in the Internet by providing a packet-division transferor.

According to one aspect of this invention, a computer system for controlling a data transfer includes a first computer system for connecting to the Internet by dialing up an Internet provider, and a second computer system connected to the Internet.

The first computer system includes a provider connector, a first connection information memory, and a first data transferor. The provider connector receives an address of the first computer system from the Internet provider at a time of dialing up the Internet provider, the first connection information memory stores the received address of the first computer system, and the first data transferor sends the received address of the first computer system to the second computer system. Then, the provider connector receives a new address of the first computer system from the Internet provider at a time of redialing up the Internet provider, and the first data transferor sends the original address of the first computer system stored in the first connection information memory and the received new address of the first computer system to the second computer system.

The second computer system includes a second connection information memory and a second data transferor. The second data transferor receives the original address of the first computer system from the first computer system, and the second connection information memory stores the received original address of the first computer system. Then, the second data transferor receives the original address of the first computer system and the new address of the first computer system, and transfers data using the received new address of the first computer system as an address of the first computer system in case that the address of the first computer system stored in the second connection information memory and the received original address of the first computer system are matched.

According to another aspect of this invention, the computer system for controlling the data transfer connected to the Internet provider includes a provider information memory for storing a provider management information necessary for connecting to the Internet provider, and a provider connection performer for selecting an Internet provider for reconnecting to the Internet based on the provider management information stored in the provider information memory, and requesting the selected Internet provider to connect in case of being disconnected from the Internet provider.

According to another aspect of this invention, the computer system for controlling the data transfer connected to the Internet provider for sending requested data to the Internet includes a data transferor, a requested data memory, and a provider connection performer. The data transferor doesn't send the requested data in case of being disconnected from the Internet provider, and the requested data memory stores the requested data, which have not been sent. The provider connection performer requests connecting to one of the Internet provider and another Internet provider in case of being disconnected from the Internet provider, and the data transferor reads out the requested data stored in the requested data memory after being connected to the Internet provider, and sends the read-out requested data to the connected Internet provider.

According to another aspect of this invention, the computer system for controlling the data transfer includes a sending computer system for sending requested data using the Internet in accordance with a protocol of a connectionless type, and a receiving computer system for receiving the requested data using the Internet in accordance with the protocol of the connectionless type. The sending computer system includes a sending data transferor, and the receiving computer system comprises a receiving data transferor. The sending data transferor sends the requested data to the receiving computer system using the Internet in accordance with the protocol of the connectionless type, and the receiving data transferor receives the requested data from the sending computer system using the Internet in accordance with the protocol of the connectionless type, and sends an arrival confirmation message to the sending computer system after receiving the requested data. Then, the sending data transferor judges if the arrival confirmation message is received from the receiving computer system after an arrival confirmation time is passed after sending the requested data, and retransmits the requested data using the Internet in accordance with the protocol of the connectionless type in case that the arrival confirmation message is not received.

Further features and applications of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

Other objects features, and advantages of the invention will be apparent from the following description when taken in conjunction with the accompany drawings.

BRIEF DESCRIPTION OF THE DRAWINGS

FIG. 3 shows an address information table managed by the date transfer processor;

FIG. 7 shows a provider management information table managed by the provider connector;

FIG. 17 shows a priority level table in embodiment 8;

DETAILED DESCRIPTION OF THE PREFERRED EMBODIMENTS

Embodiments of this invention are explained with reference to the drawings.

Embodiment 1

In embodiment 1, when computers 100a and 100b are disconnected due to a failure in a dialing-up connection, the computers 100a and 100b can be reconnected by negotiating each other based on address information provided before being disconnected.

Embodiment 1 is explained with reference to FIGS. 1–5.

Figure 1:
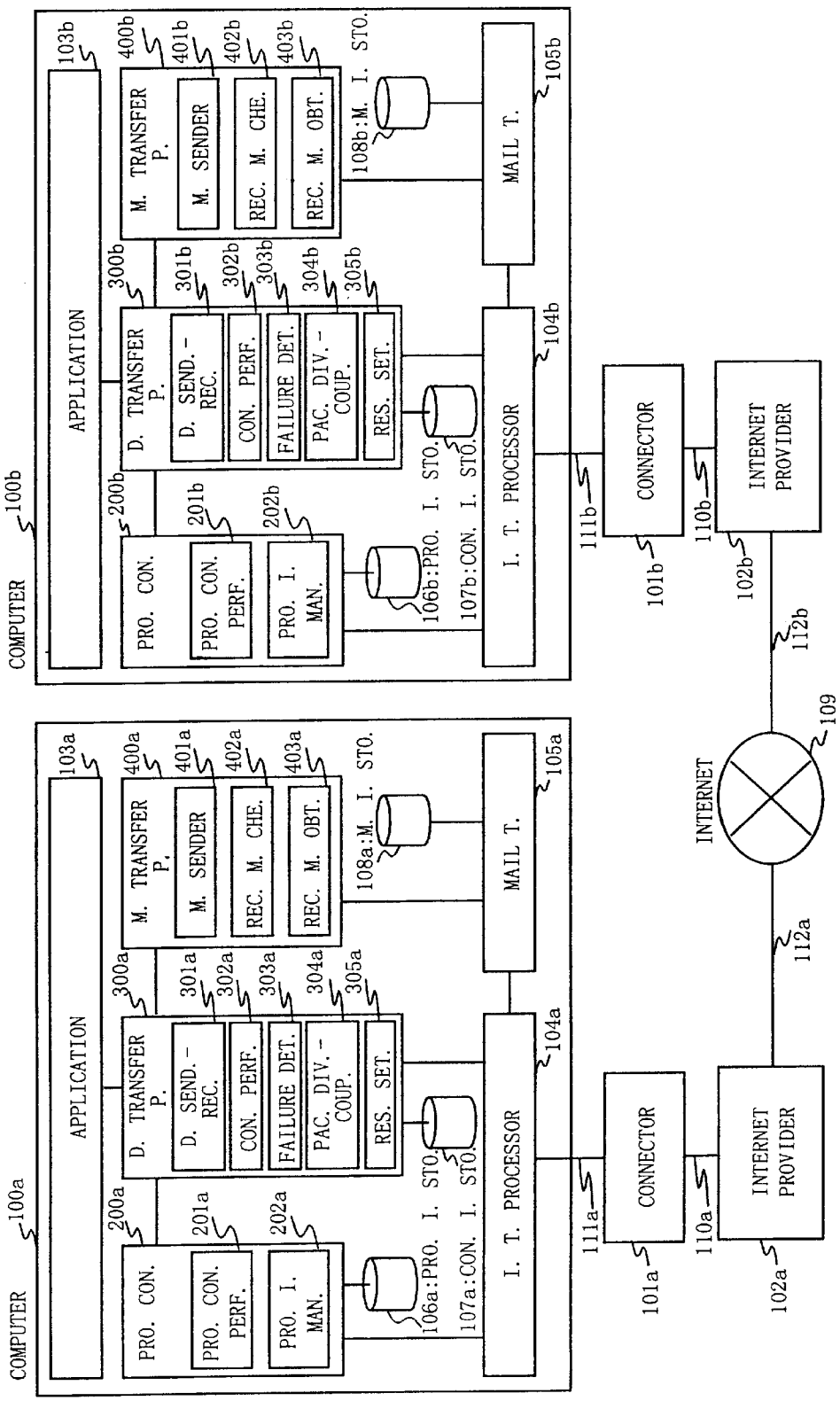
FIG. 1 shows a whole configuration chart combining each of embodiments of the system for controlling the data transfer.
Figure 2:
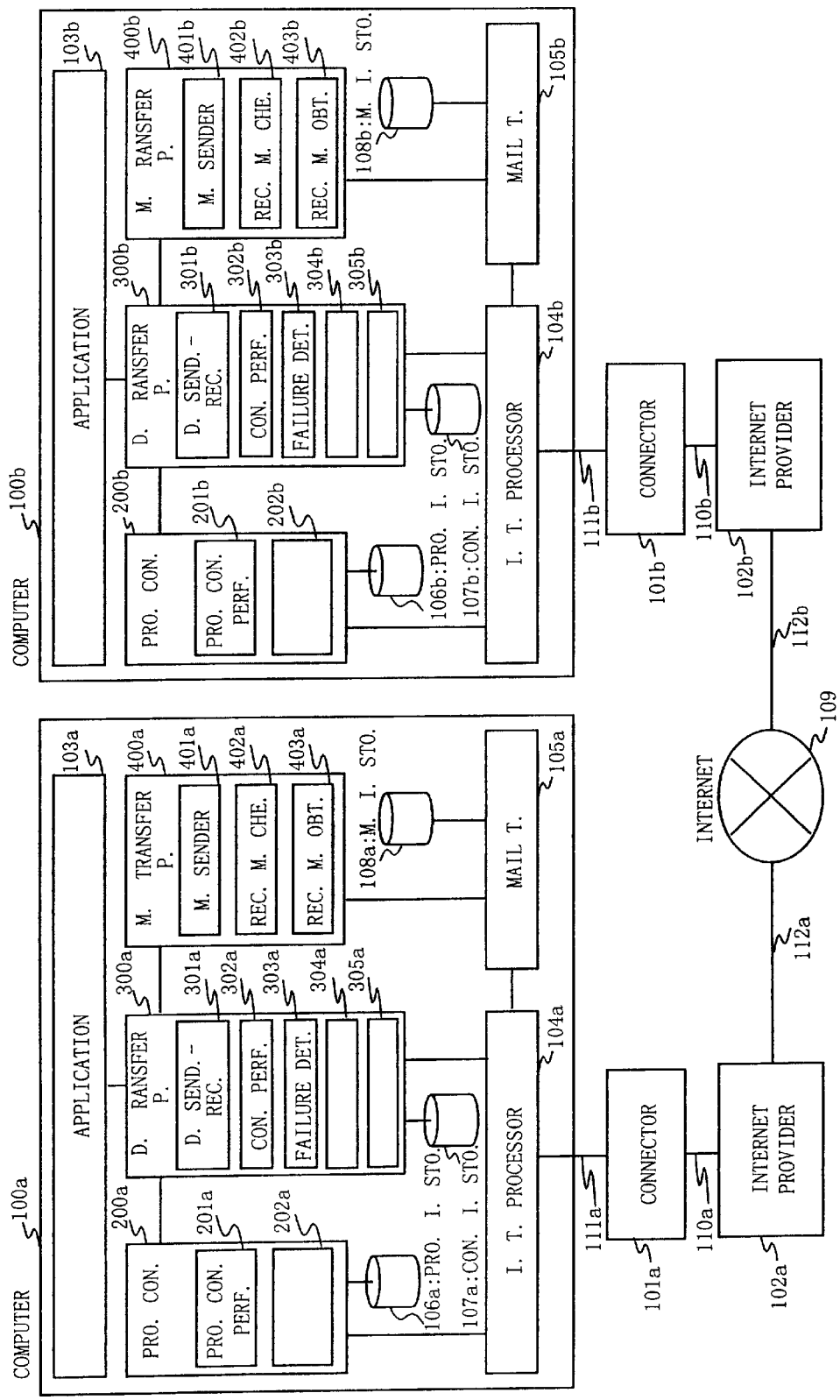
FIG. 2 illustrates a main configuration of the system in embodiment 1.
Figure 4:
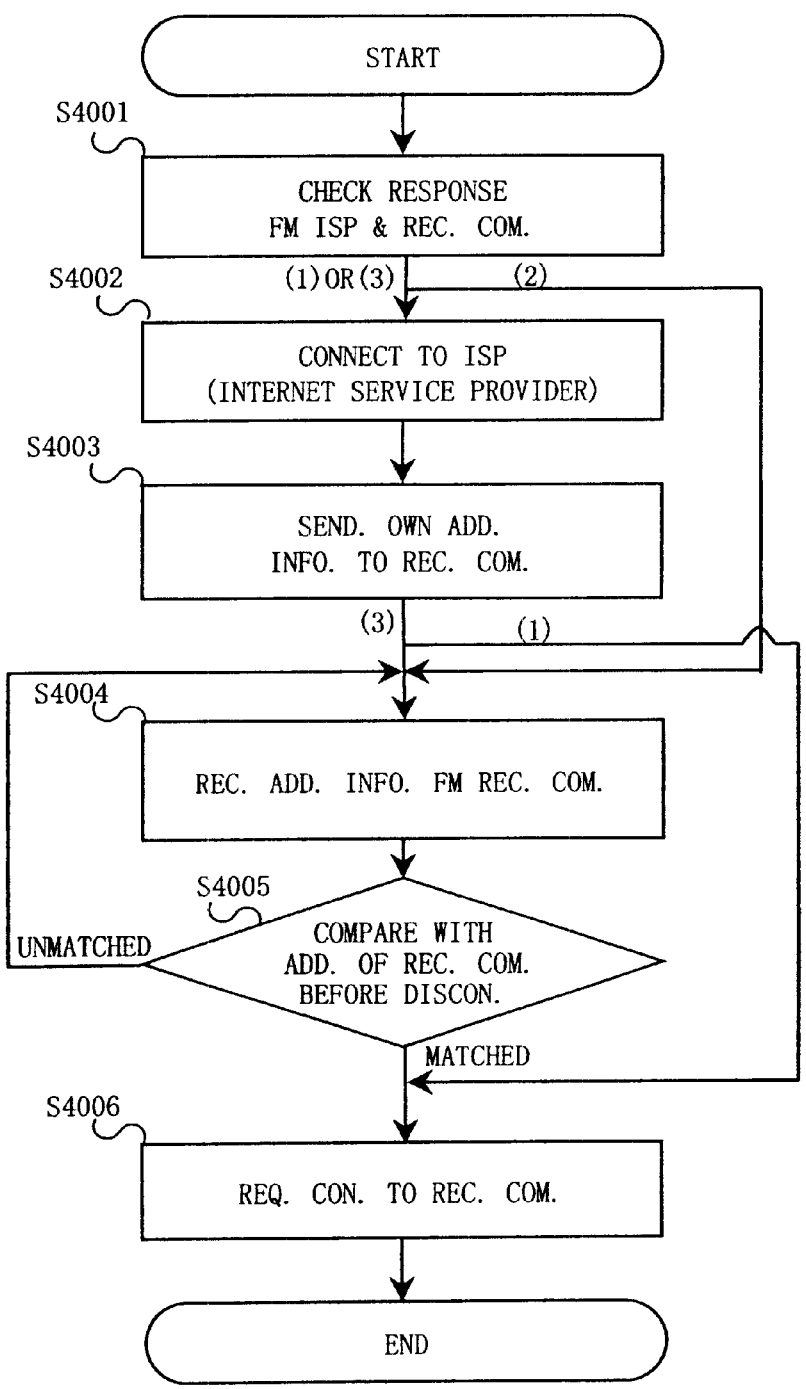
FIG. 4 shows a flow chart of a processing operation of the sending computer in the system for controlling the data transfer in embodiment 1.
Figure 5:
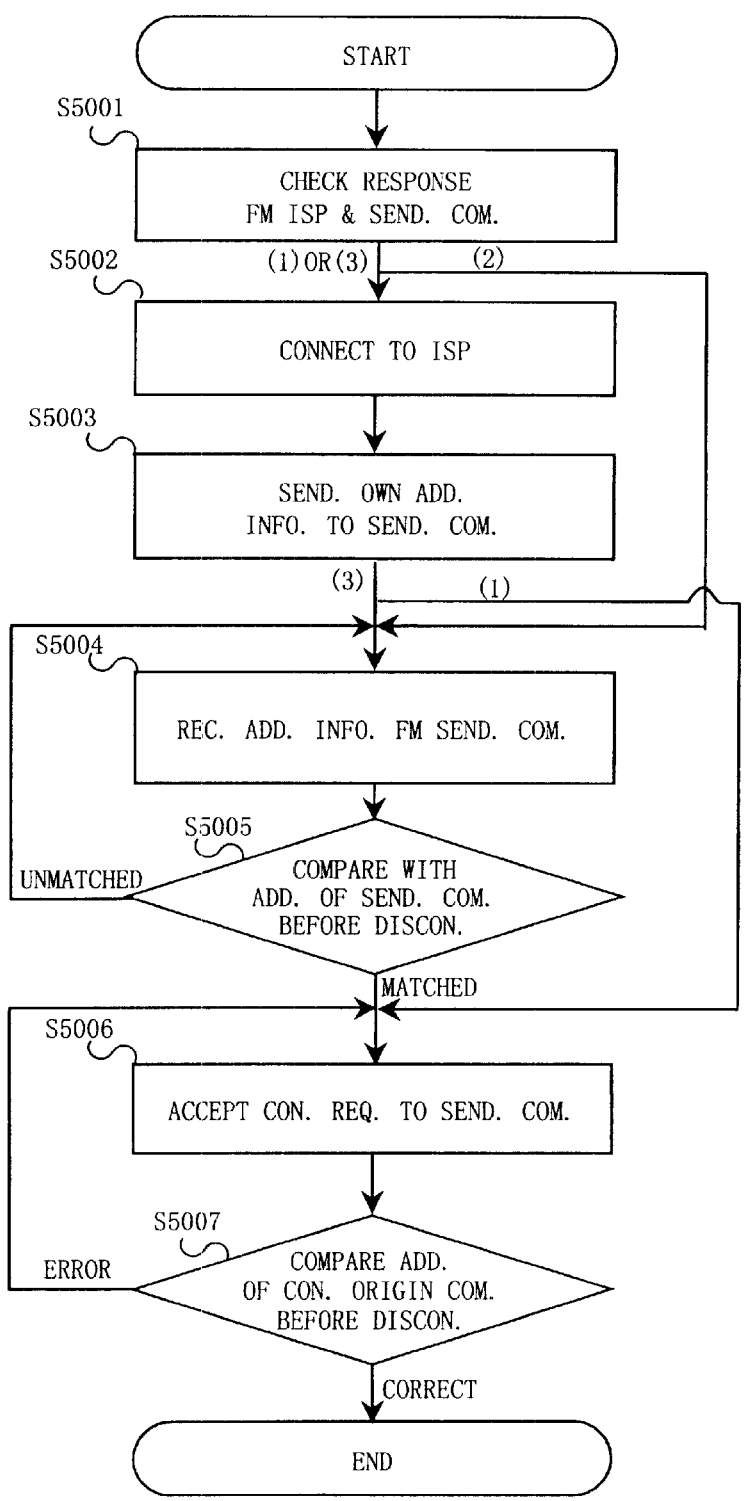
FIG. 5 shows a flow chart of a processing operation of the receiving computer in the system for controlling the data transfer in embodiment 1.

FIG. 1 shows a whole configuration chart combining each of embodiments of the system for controlling the data transfer. FIG. 2 illustrates a main configuration of the system in embodiment 1. Embodiment 1 includes the configuration of FIG. 1. However, elements, which are not necessary for explanation of embodiment 1, are omitted in FIG. 2 to simplify the drawing for better understanding of characteristics. FIG. 3 shows an address information table managed by a data transfer processor 300. FIG. 4 shows a flow chart of a processing operation of a sending computer in the system for controlling the data transfer according to embodiment 1. FIG. 5 shows a flow chart of a processing operation of a receiving computer in the system for controlling the data transfer according to embodiment 1.

In FIG. 2, the system for controlling the data transfer is packaged in the computers 100a and 100b. In FIG. 2, connector 101a connects the computer 100a and Internet provider 102a by using a telephone line, and connector 101b connects the computer 100b and Internet provider 102b by using the telephone line. Internet provider 102a connects the computer 100a to the Internet, and Internet provider 102b connects the computer 100b to the Internet. Application 103a issues the request for the data transfer in the computer 100a, and application 103b issues the request for the data transfer in the computer 100b. Information transmission processors 104a and 104b input and output data transferred between the computers 100a and 100b connected through the Internet providers. Mail transmitters 105a and 105b send and receive a mail between the computers 100a and 100b, and provider information storage 106a stores information on the Internet providers, to which the computer 100a can be connected. (The storage is a so-called database, hereinafter.) Provider information storage 106b stores information on the Internet providers, to which the computer 100b can be connected. Connection information storage 107a manages address information provided for the computers 100a and 100b, and connection information storage 107b manages address information provided for the computers 100a and 100b. Mail information storage 108a stores mail information from the computer 100b, and mail information storage 108b stores mail information from the computer 100a. Provider connector 200a supports processing for connecting the computer 100a to the Internet provider 102a, and provider connector 200b supports processing for connecting the computer 100b to the Internet provider 102b. Provider connection performer 201a actually connects the computer 100a to the Internet provider 102a, and provider connection performer 201b actually connects the computer 100b to the Internet provider 102b. Data transfer processors 300a and 300b support processing for the data transfer from the applications. Data sender-receivers 301a and 301b send and receive data between the computers 100a and 100b, and connection performers 302a and 302b perform processing for connecting for a transmission between the computers 100a and 100b. Failure detectors 303a and 303b detect a cause of a failure occurred during the processing for the data transfer between the computers 100a and 100b. Mail transfer processor 400a supports sending of the mail to the computer 100b and receiving of the mail by the computer 100b, and mail transfer processor 400b supports sending of the mail to the computer 100a and receiving of the mail by the computer 100a. Mail sender 401a generates and sends the mail to the computer 100b, and mail sender 401b generates and sends the mail to the computer 100a. Receiving mail checker 402a confirms an arrival of the mail from the computer 100b, and receiving mail checker 402b confirms an arrival of the mail from the computer 100a. Receiving mail obtainer 403a receives the mail from the mail information storage through the mail transmitter 105a, and receiving mail obtainer 403b receives the mail from the mail information storage through the mail transmitter 105b. Internet 109, telephone line 110, and transmission lines 111 and 112 are also illustrated in FIG. 2.

In FIG. 3, an address information table 3000 is illustrated. In this table, an IP address 3001 and a port number 3002 are shown.

Operations are explained.

The computer 100a is connected to the Internet provider 102a by a dialing-up connection, and the computer 100b is connected to the Internet provider 102b by a dialing-up connection. The dialing-up connection is a method for connecting the computer to the network, e.g., Internet by using the public telephone line, only when it is necessary. The computer is not always connected to the network in this method.

When the computer 100a is connected by dialing up, IP address for transmitting between the computers 100a and 100b is provided by the Internet provider. When the computer 100b is connected by dialing up, IP address for transmitting between the computers 100a and 100b is provided by the Internet provider.

In this invention, the data transfer processor 300a is provided between the application 103a and the data transmission processor 104a for processing the data transfer between the computers 100a and 100b, which are connected by dialing up. The data transfer processor 300b is provided between the application 103b and the data transmission processor 104b for processing the data transfer between the computers 100a and 100b, which are connected by dialing up. When there is a request for connecting for a transmission from the application 103a in the computer 100a to the application 103b in the computer 100b, a connection is established between the computers 100a and 100b through the connection performer 302a in the data transfer processor 300a and the connection performer 302b in the data transfer processor 300b. Then, the data sender-receiver 301a in the data transfer processor 300a and the data sender-receiver 301b in the data transfer processor 300b perform the data transfer between the computers 100a and 100b by a request for the data transfer from the application 103a. Hereinafter, the computer 100a is called as a sending computer, and the computer 100b is called as a receiving computer.

In the sending computer 100a, the request for the data transfer from the application 103a is sent to the data sender-receiver 301a in the data transfer processor 300a. In the data sender-receiver 301a, the address information table 3000 of the sending computer 100a and the receiving computer 100b is stored in the connection information storage 107a, and the data transfer from the sending computer 100a to the receiving computer 100b is processed.

An internal operation in the sending computer 100a for restoring the connection in case that a failure is occurred in the network is explained with reference to FIG. 4.

When the failure is occurred in the network during the data transfer from the sending computer 100a to the receiving computer 100b, the failure detector 303a in the data transfer processor 300a checks a response from the Internet provider 102a and the receiving computer 100b to specify a location of the failure. The responses obtained in the checking are in three combinations, i.e., (1) a response from the receiving computer 100b, but no response from the Internet provider 102a, (2) no response from the receiving computer 100b, and a response from the Internet provider 102a, and (3) no response from the receiving computer 100b and the Internet provider 102a. In case of (1) and (3), the processing goes to step S4002, and in case of (2), the processing goes to step S4004 (step S4001).

Then, the connection performer 302a in the data transfer processor 300a calls the provider connection performer 201a in the provider connector 200a, and reconnects to the Internet provider 102a. The provider connection performer 201a stores a telephone number of an access point, registered user name, and password for the disconnected Internet provider in the provider information storage 106a, in advance. The provider connection performer 201a reconnects to the Internet provider based on the information in the provider information storage 106a, and obtains a new IP address from the Internet provider (step S4002).

The connection performer 302a sends the stored address information of the sending computer 100a, the new IP address obtained in step S4002, and the user name to the receiving computer 100b through the mail transferor 401a in the mail transfer processor 400a (step S4003). In case of (1), the processing goes to step S4006, and in case of (3), the processing goes to step S4004.

When there is no response from the receiving computer 100b, the connection performer 302a checks a receipt of a new mail through a receiving mail checker 402a in the mail transfer processor 400a. Then, the connection performer 302a calls the receiving mail obtainer 403a, and obtains the new mail from the mail information storage 108a through the mail transmitter 105a (step S4004).

In the connection performer 302a, the address information of the receiving computer before disconnecting is extracted from the obtained new mail, and compared with the address information of the receiving computer stored in the connection information storage 107a. If they are matched, the processing goes to the next step. If they are not matched, the processing goes back to step S4004 (step S4005).

The connection performer 302a reconnects to the receiving computer based on the new address of the receiving computer obtained in step S4005 (step S4006).

An internal operation in the receiving computer 100b for restoring the connection in case that a failure is occurred in the network is explained with reference to FIG. 5.

When the failure is occurred in the network during the data transfer from the sending computer 100a to the receiving computer 100b, the data sender-receiver 301b checks a response from the Internet provider 102b and the sending computer 100a to specify a location of the failure in the network. The response obtained in the checking are in three combinations, i.e., (1) a response from the sending computer 100a, but no response from the Internet provider 102b, (2) no response from the sending computer 100a, and a response from the Internet provider 102b, and (3) no response from the sending computer 100a and the Internet provider 102b. In case of (1) and (3), the processing goes to step S5002, and in case of (2), the processing goes to step S5004 (step S5001).

Then, the connection performer 302b in the data transfer processor 300b calls the provider connection performer 201b in the provider connector 200b, and reconnects to the Internet provider 102b. The provider connection performer 201b stores necessary data for connecting to the Internet provider, i.e., the telephone number of the access point, registered user name, and password for the disconnected Internet provider 102b in the provider information storage 106b, in advance. The provider connection performer 201b reconnects to the Internet provider, and obtains a new IP address from the Internet provider (step S5002).

The connection performer 302b sends the stored address information of the receiving computer 100b, the new IP address obtained in step S5002, and the user name to the sending computer 100a through the mail transferor 401b in the mail transfer processor 400b (step S5003). In case of (1), the processing goes to step S5006, and in case of (3), the processing goes to step S5004.

When there is no response from the sending computer 100a, the connection performer 302b checks a receipt of a new mail from the receiving computer through a receiving mail checker 402b in the mail transfer processor 400b. Then, the connection performer 302b calls a receiving mail obtainer 403b, and obtains the new mail from the mail information storage 108b through the mail transmitter (step S5004).

In the connection performer 302b, the address information of the sending computer before disconnecting is extracted from the obtained new mail, and compared with the address information of the sending computer stored in the connection information storage. If these addresses are matched, the processing goes to the next step. If the addresses are not matched, the processing goes back to step S5004 (step S5005).

The connection performer 302b accepts a request for reconnecting from the sending computer (step S5006).

When there is the request for reconnecting, the connection performer 302b compares the address of the computer requesting to connect and the new address of the sending computer obtained in step S5004. If the addresses are matched, the reconnection is completed. If the addresses are not matched, the processing goes back to step S5006 (step S5007).

As stated, in embodiment 1, even if a failure is occurred in the dial-up connection and the computers 100a and 100b are disconnected, the data transfer processor automatically restores the connection between the Internet provider and the computer, to which the data are transferred. Hence, the processing can be continued without influencing the application.

Embodiment 2

Figure 8:
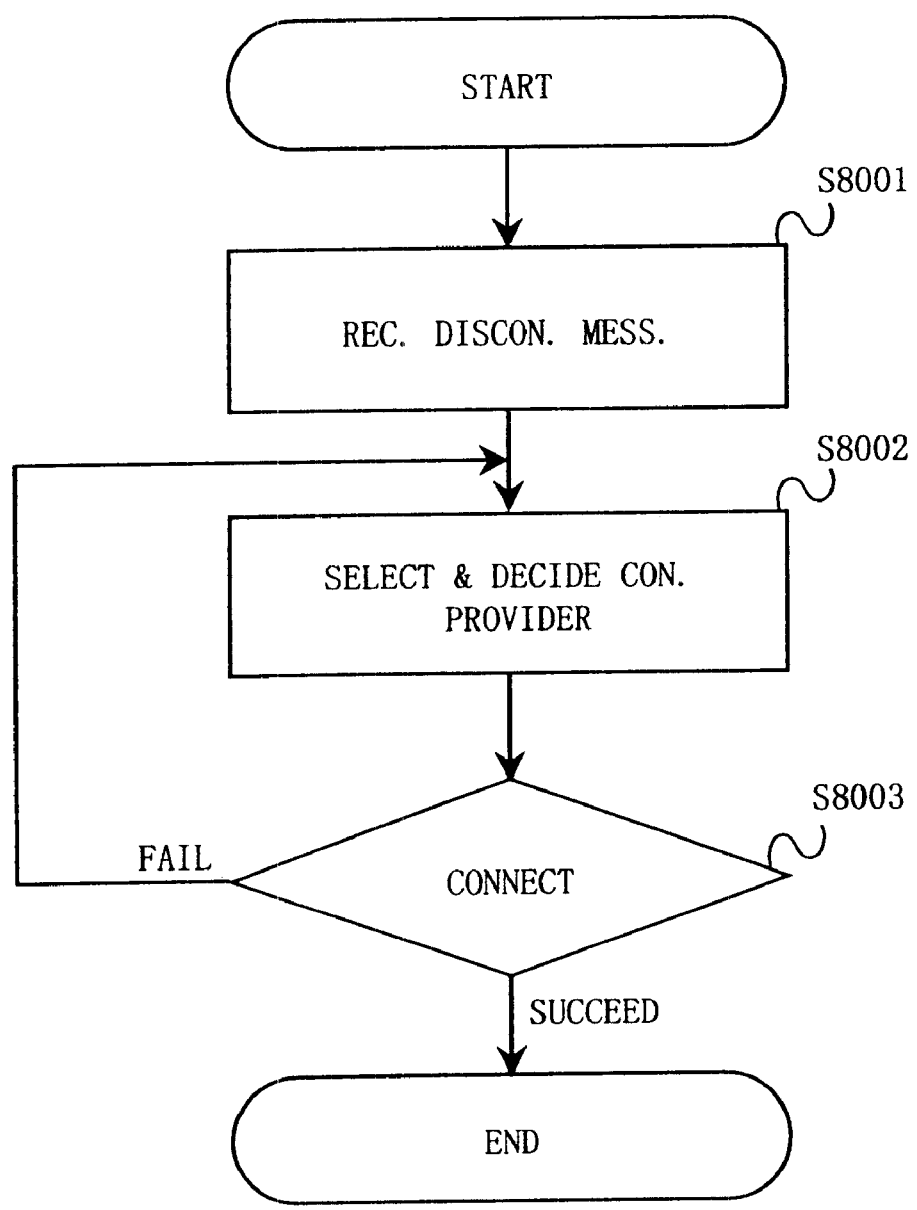
FIG. 8 shows a flow chart of a processing operation in the system for controlling the data transfer in embodiment 2.

Embodiment 2 is explained with reference to FIGS. 6–8.

Figure 6:
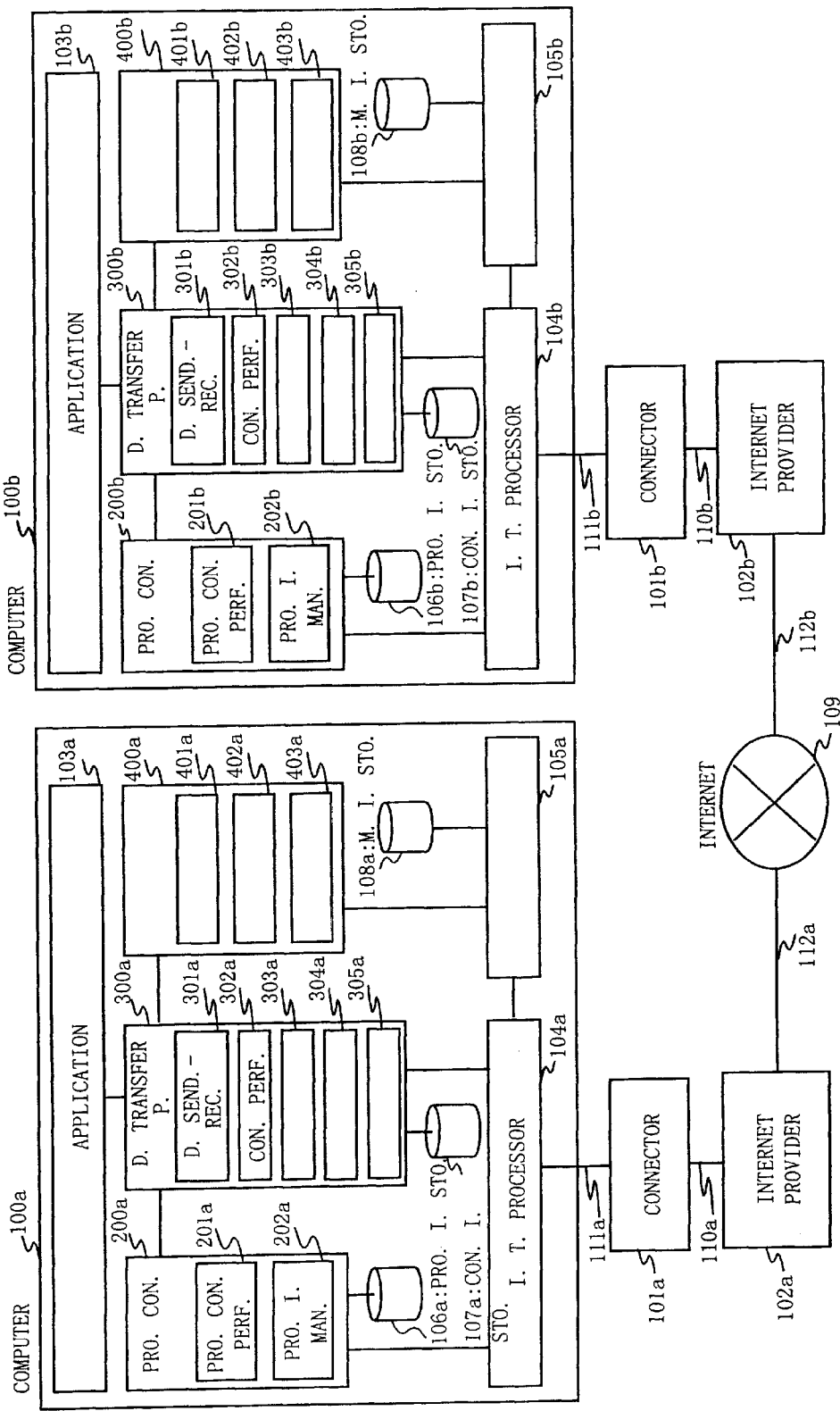
FIG. 6 illustrates a main configuration of the system in embodiment 2.

FIG. 6 illustrates a main configuration of embodiment 2. The embodiment 2 includes the configuration of FIG. 1. However, in FIG. 6, the elements which are not necessary for the explanation of embodiment 2 are omitted to simplify FIG. 6 for better understanding of the characteristics. FIG. 7 illustrates the provider management information table 7000 managed by the provider connectors 200a and 200b. FIG. 8 shows a flow chart of the processing by the system for controlling the data transfer in embodiment 2.

In FIG. 6, provider information managers 202a and 202b manage connecting Internet provider information.

FIG. 7 illustrates the provider management information table 7000. A telephone number 7001 of an access point of the Internet provider, domain name system (DNS) server name 7002, user name 7003 registered to the Internet provider, and password 7004 are shown.

An internal operation of the sending computer 100*a* in embodiment 2 are explained with reference to FIG. 8.

When the request for the data transfer is sent from the application 103*a* to the data sender-receiver 301*a* of the data transfer processor 300*a* in the computer 100*a*, the request is sent to the transmission line 111*a* through the information transmission processor 104*a*, and delivered to the computer 100*b* via the Internet providers 102*a* and 102*b*.

If a failure is occurred between the computer 100*a* and the Internet providers 102*a* in the network, the provider connection performer 201*a* in the provider connector 200*a* is called through the connection performer 302*a* in the data transfer processor 300*a*. Then, a reconnection is requested to the Internet provider based on the provider information stored before disconnecting (steps S8001–S8003).

If the reconnection processing is failed, the provider information manager 202*a* refers to the provider information management table in the provider information storage 106*a*, and selects and decides a reconnecting Internet provider (step S8002).

The provider information manager 202*a* performs the reconnection processing based on the provider information obtained in step S8002. If the reconnection processing is failed, the processing goes back to step S8002 (step S8003).

As stated, in embodiment 2, the provider connector automatically performs the processing for connecting to the Internet provider. Therefore, even if the connection to the disconnected Internet provider is failed, the processing can be continued by connecting to a substitute provider.

Embodiment 3

Embodiment 3 is explained with reference to FIG. 9.

Figure 9:
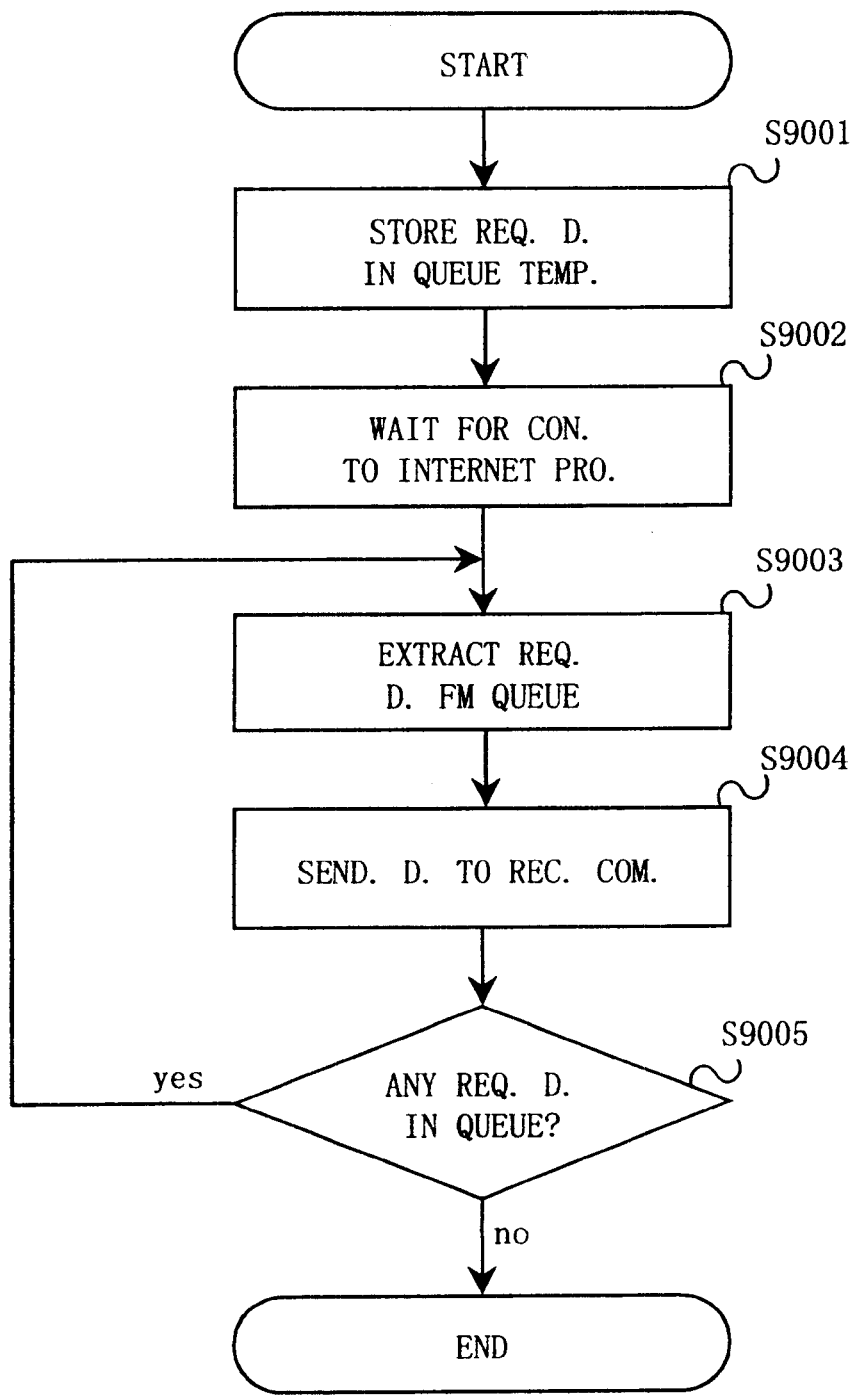
FIG. 9 shows a flow chart of a processing operation in the system for controlling the data transfer in embodiment 3.

FIG. 9 shows a flow chart of the processing operation of the system for controlling the data transfer in embodiment 3. An internal operation of the sending computer 100*a* in embodiment 3 is explained with reference to FIG. 9.

In embodiment 3, even if the computer 100*a* and the Internet provider 102*a* are disconnected, the request from the application 103*a* is accepted. When the connection is restored, the data can be sent to the receiving computer 100*b* consecutively.

When the request for the data transfer is sent from the application 103*a* to the data sender-receiver 301*a* in the data transfer processor 300*a* in the computer 100*a*, if the computer 100*a* and the Internet provider 102*a* are disconnected, requested data (data requested to be transferred) are stored in a requested data queue in the connection information storage 107*a* temporarily (step S9001).

Then, the provider connection performer 201*a* in the provider connector 200*a* is called through the connection performer 302*a*, and a completion of reconnecting to the Internet provider 102 is waited (step S9002).

When the computer 100*a* and the Internet provider 102*a* are reconnected, and the data transfer processing between the computers 100*a* and 100*b* becomes possible in step S9002, the data sender-receiver 301*a* extracts the requested data from the requested data queue in the connection information storage 107*a* (step S9003), and performs the processing for the data transfer to the receiving computer (step S9004).

If there remains the requested data in the queue, the processing goes back to step S9003. The processing is completed when no requested data are left in the queue (step S9005).

As stated, in embodiment 3, even if the sending computer and the Internet provider are disconnected, the request can be issued to the receiving computer without influencing the application.

Embodiment 4

Embodiment 4 is explained with reference to FIG. 10.

Figure 10:
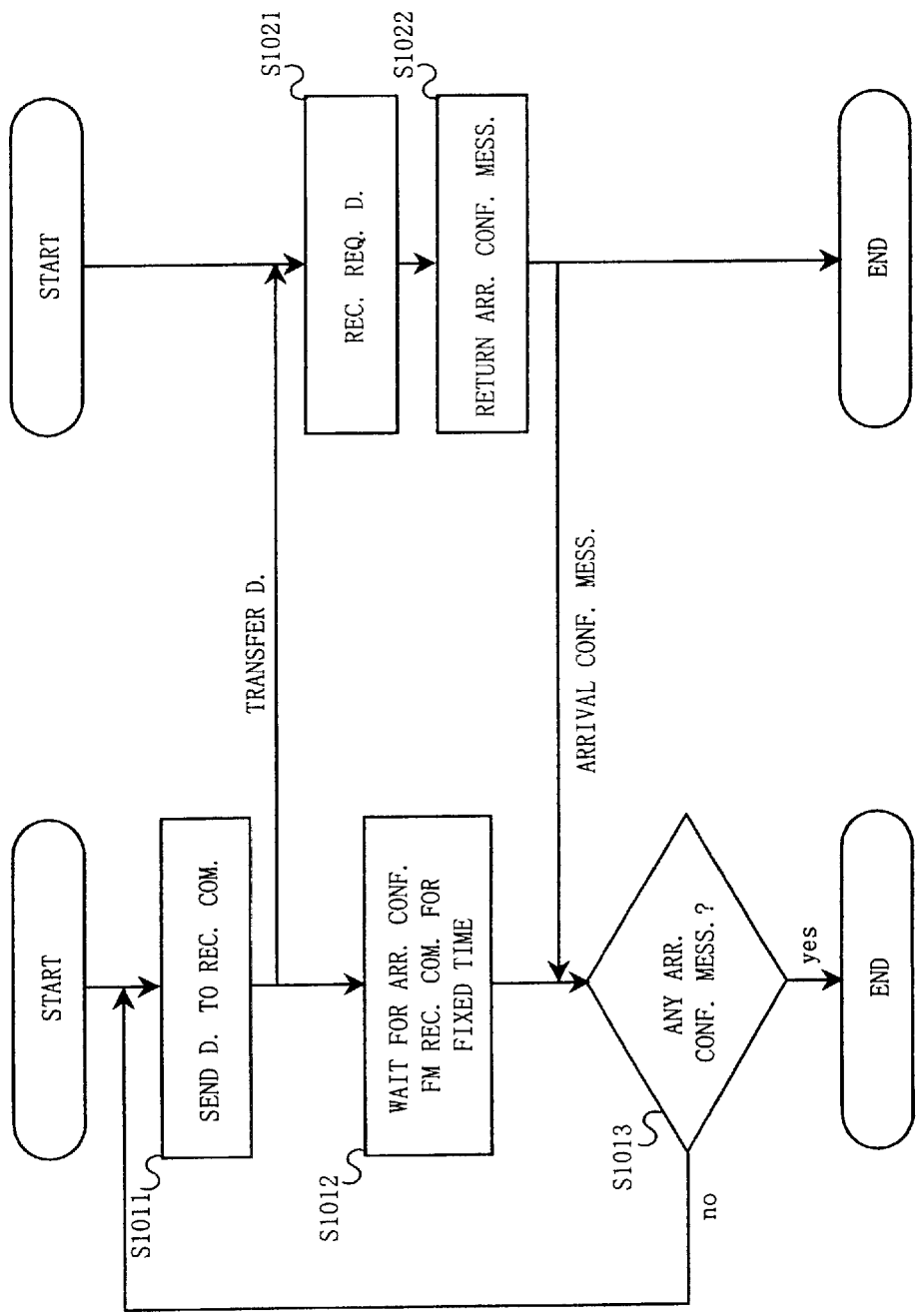
FIG. 10 shows a flow chart of a processing operation in the system for controlling the data transfer in embodiment 4.

FIG. 10 shows a flow chart of the system for controlling the data transfer in embodiment 4.

An internal operation of the sending computer 100*a* in embodiment 4 is explained with an emphasis on the function of the data transfer processor 300*a* with reference to FIG. 10.

According to embodiment 4, even if the computer 100*a* and the Internet provider 102*a* are disconnected while the requested data are transferred between the computers 100*a* and 100*b*, the requested data can be resent from the sending computer 100*a*. Particularly, this invention is effective in a protocol for performing a connectionless type transmission, e.g., UDP (User Datagram Protocol), etc.

When the request for the data transfer from the application 103*a* is sent to the data sender-receiver 301*a* in the data transfer processor 300*a* in the sending computer 100*a*, the data are sent to the transmission line 111*a* through the data transmission processor 104*a*, and delivered to the computer 100*b* through the Internet providers 102*a* and 102*b* (step S1011).

The data sender-receiver 301*a* waits for the arrival confirmation message from the receiving computer 100*b* for a determined time (step S1012).

When the arrival confirmation message is received from the receiving computer 100*b*, the processing is completed. If the arrival confirmation message is not received, the processing goes back to step S1011 (step S1013).

The data transfer processor 300*b* in the receiving computer 100*b* receives the requested data from the sending computer 100*a* by the data sender-receiver 301*b* (step S1021), and returns the arrival confirmation message to the sending computer 100*a* (step S1022).

As stated, in embodiment 4, even if a failure is occurred in the network during the transfer of the requested data between the computers 100*a* and 100*b*, the data can be resent by using the arrival confirmation message from the receiving computer.

Embodiment 5

Embodiment 5 is explained with reference to FIGS. 11 and 12.

Figure 11:
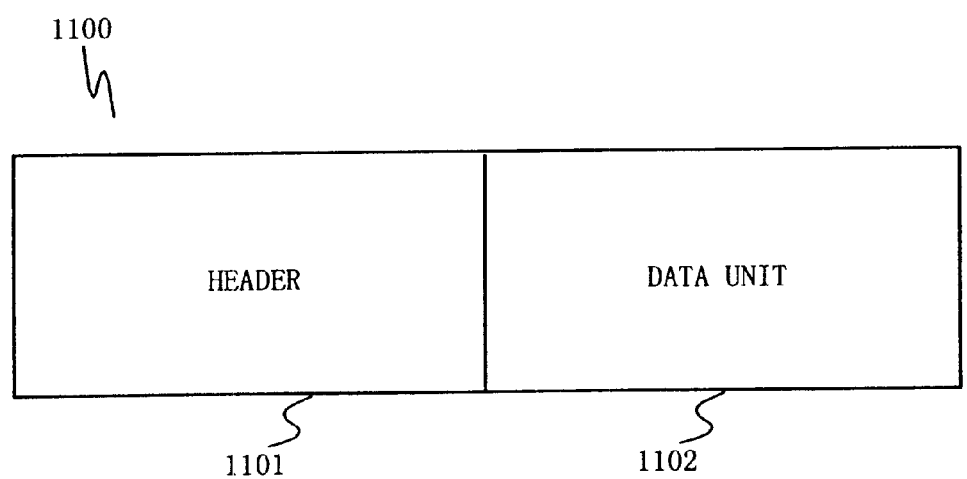
FIG. 11 illustrates an internal configuration of requested data sent and received between the computers.
Figure 12:
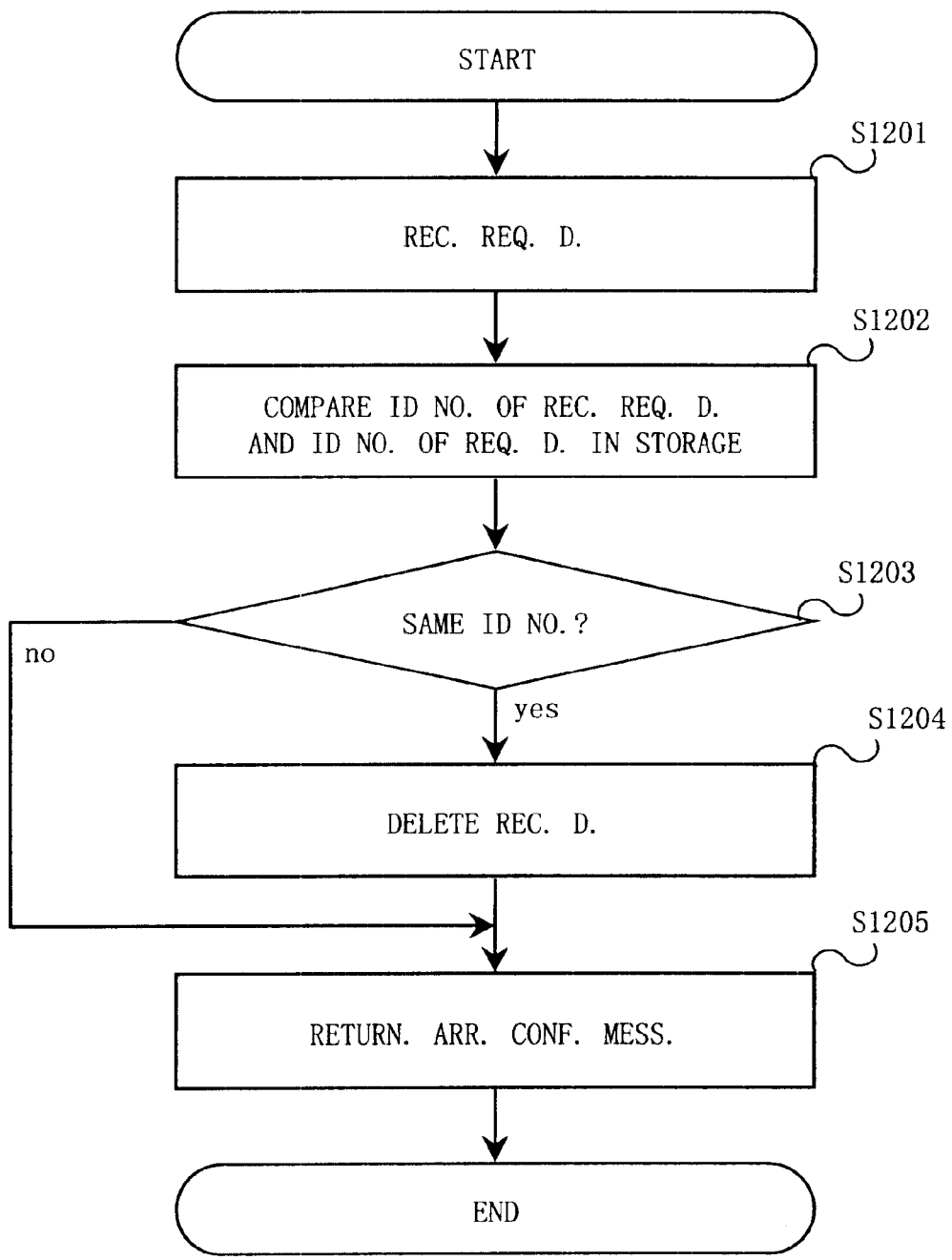
FIG. 12 shows a flow chart of a processing operation in the system for controlling the data transfer in embodiment 5.

FIG. 11 illustrates an internal configuration of the requested data sent and received between the computers 100*a* and 100*b*. FIG. 12 shows a flow chart of the processing operation of the system for controlling the data transfer according to embodiment 5.

In FIG. 11, requested data 1100, header 1101 for storing identification data of the requested data, and data unit 1102 for storing the data sent and received between the computers 100*a* and 100*b*.

When overlapping requested data are transferred between the computers 100*a* and 100*b*, the receiving computer can judge if the data should be received according to embodiment 5.

When the data transfer processor 300*a* receives the request for the transfer of the requested data from the application 103*a*, the data transfer processor 300*a* attaches the header 1101 to the requested data, stores a unique number in the header for identifying the requested data, and transfers the data to the receiving computer 100*b*.

An internal operation of the receiving computer 100*b* according to embodiment 5 is explained with reference to FIG. 12.

When the data transfer processor 300*b* in the receiving computer 100*b* receivers the requested data with the header, the data transfer processor 300*b* stores the requested data in the connection information storage 107*b*, and returns the request for the arrival confirmation to the sending computer 100*a*.

If the receiving computer 100*b* receives the requested data by using the data sender-receiver 301*b* in the data transfer processor 300*b* (step S1201), the receiving computer 100*b* compares an identification number of the received requested data and an identification number of the requested data stored in the connection information storage (step S1202).

If these identification numbers are matched, the received requested data are deleted. If the identification numbers are not matched, the requested data are deleted. Then, the received new requested data are stored in the connection information storage (steps S1203 and S1204), and returns the arrival confirmation message to the sending computer (step S1205).

As stated, even if a failure is occurred in the network while returning the arrival confirmation message for the data transfer between the computers 100*a* and 100*b*, the receiving computer can judge if redundant requested data resent from the sending computer should be received by using the identification number attached to the requested data, and delete the received data, if necessary.

Embodiment 6

Embodiment 6 is explained with reference to FIGS. 13 and 14.

Figure 13:
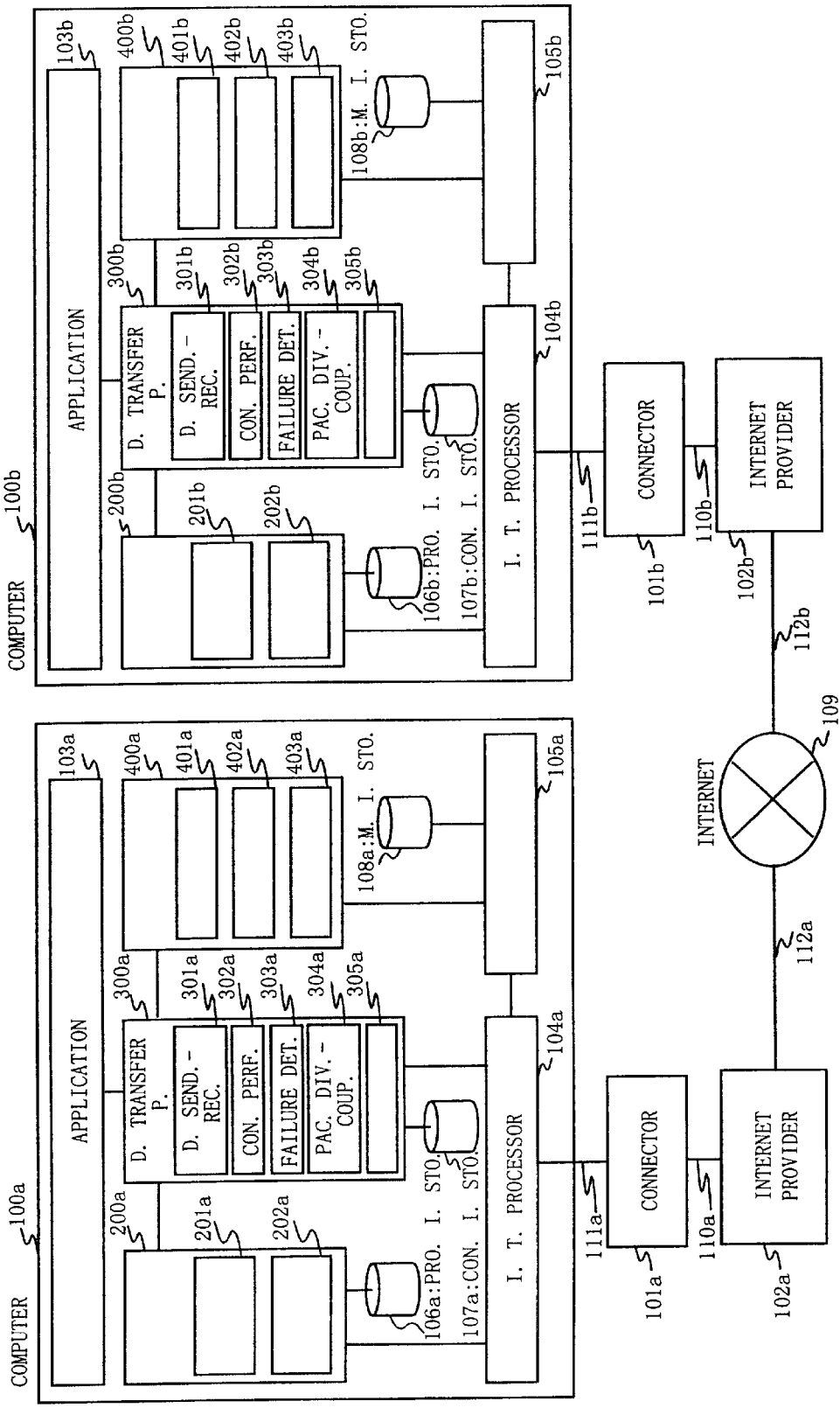
FIG. 13 illustrates a main configuration of the system in embodiment 6.
Figure 14:
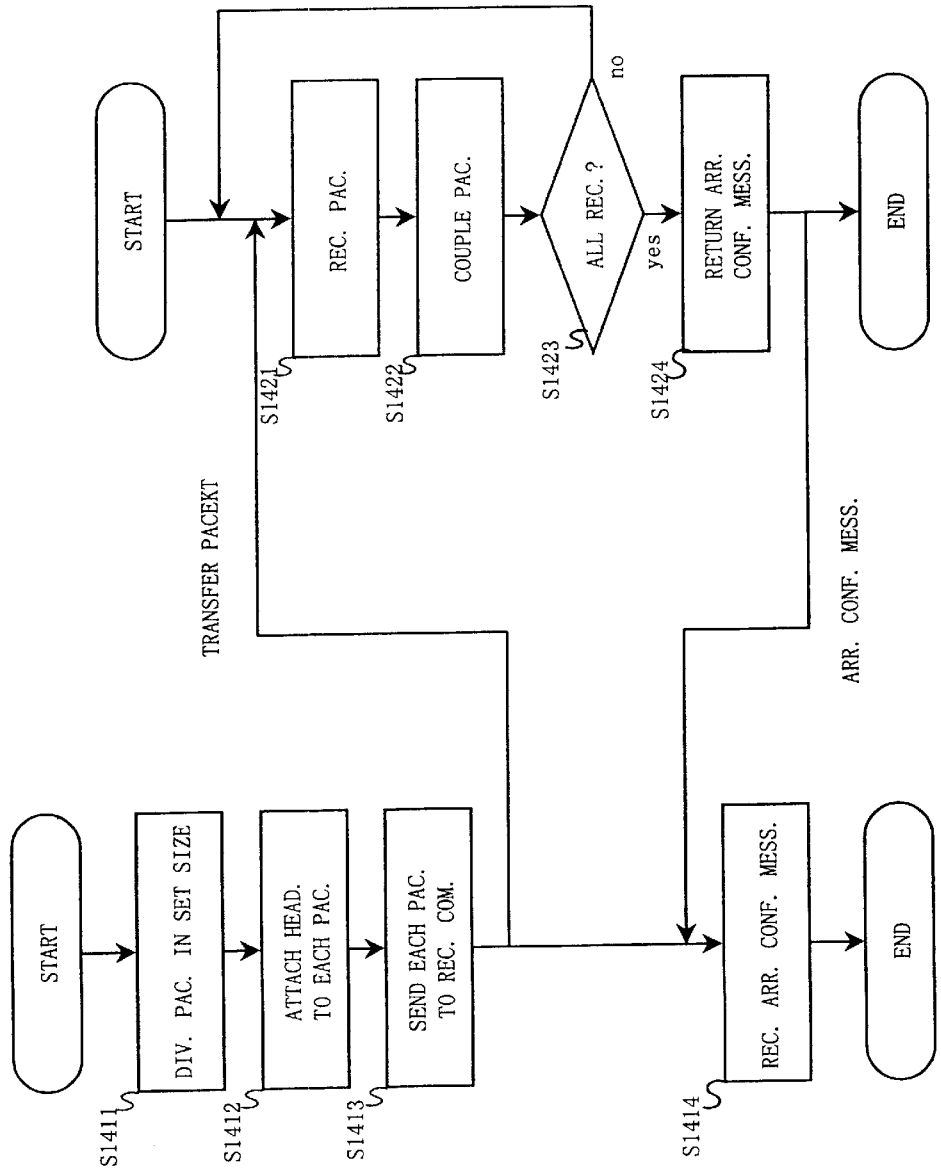
FIG. 14 shows a flow chart of a processing operation in the system for controlling the data transfer in embodiment 6.

FIG. 13 illustrates a main configuration of embodiment 6. The embodiment 6 includes the configuration of FIG. 1. However, in FIG. 13, the elements which are not necessary for the explanation of embodiment 6 are omitted to simplify FIG. 13 for better understanding of the characteristics. FIG. 14 shows a flow chart of the processing operation by the system for controlling the data transfer in embodiment 6.

In FIG. 13, packet divider—couplers 304*a* and 304*b* divide the requested data into packets, and couple the divided packets to restore the original requested data.

An internal operation of the receiving computer 100*b* in embodiment 6 is explained with reference to FIG. 14.

In embodiment 6, when the data in a long size, e.g., memory information, application program, etc. are transferred between the computers 100*a* and 100*b*, the data are divided into small packets, and transferred. Hence, troubles such as a failure in the network and a loss of a packet can be prevented.

The data transfer processor 300*a* predetermines a size of the data, which can be transferred at once. When a size of the data requested by the application 103*a* to be transferred exceeds the predetermined size of the data, the packet divider—coupler 304*a* in the data transfer processor 300*a* divides the data into the packets in the predetermined size (step S1411).

The header 1101 is attached to each of the packets. A unique identification number, total packet number, and current packet number are stored in the header (step S1412).

The data sender—receiver 301*a* in the sending computer 100*a* sends the packets divided in step S1411 to the receiving computer 100*b* in an order of the packet numbers (step S1413), and receives the arrival confirmation message at the end (step S1414).

When the data sender—receiver 301*b* in the receiving computer 100*b* receives the packet transferred from the sending computer 100*a* (step S1421), the packet divider—coupler 304*b* adds the received packet to the packets, which are already received (step S1422).

Then, the total packet number and the current packet number are compared by checking the header of the received packet. If it is confirmed that all the packets have been received, the processing goes to the next step, and if it is not confirmed, the processing goes back to step S1421 (step S1423).

When all the packets are received from the sending computer 100*a*, the arrival confirmation message is sent back to the sending computer (step S1424).

In the data transfer in the Internet, when a size of the transferring data increases, a possibility of a packet loss increases due to a capacity of the Internet provider, traffic condition of the network, and bandwidth.

As stated, in embodiment 6, when the data are transferred between the computers 100*a* and 100*b*, even if the data are in a big size, troubles such as a failure in the network and the loss of the packet are prevented by dividing the data to small packets.

Embodiment 7

Embodiment 7 is explained with reference to FIGS. 15 and 16.

Figure 15:
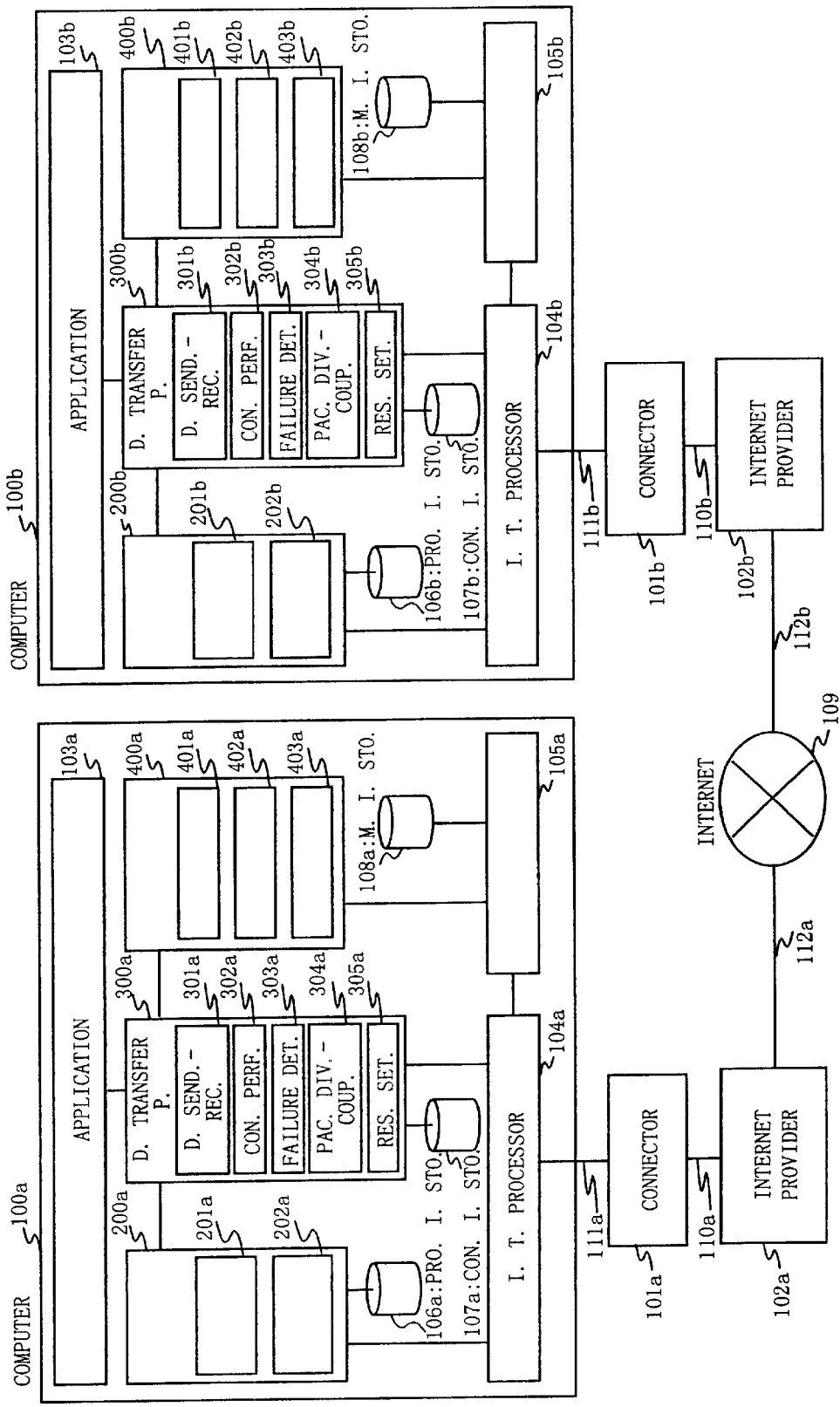
FIG. 15 illustrates a main configuration of the system in embodiment 7.
Figure 16:
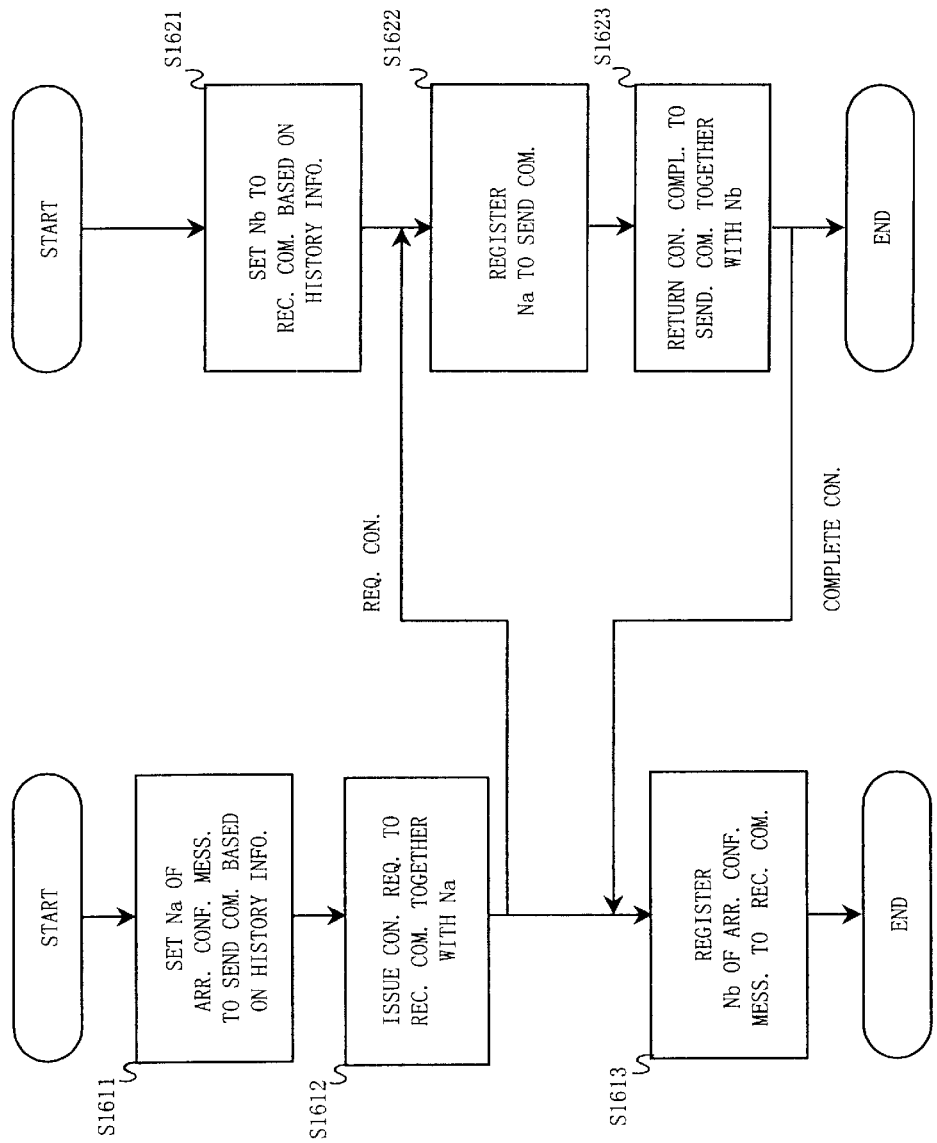
FIG. 16 shows a flow chart of a processing operation in the system for controlling the data transfer in embodiment 7.
Figure 18:
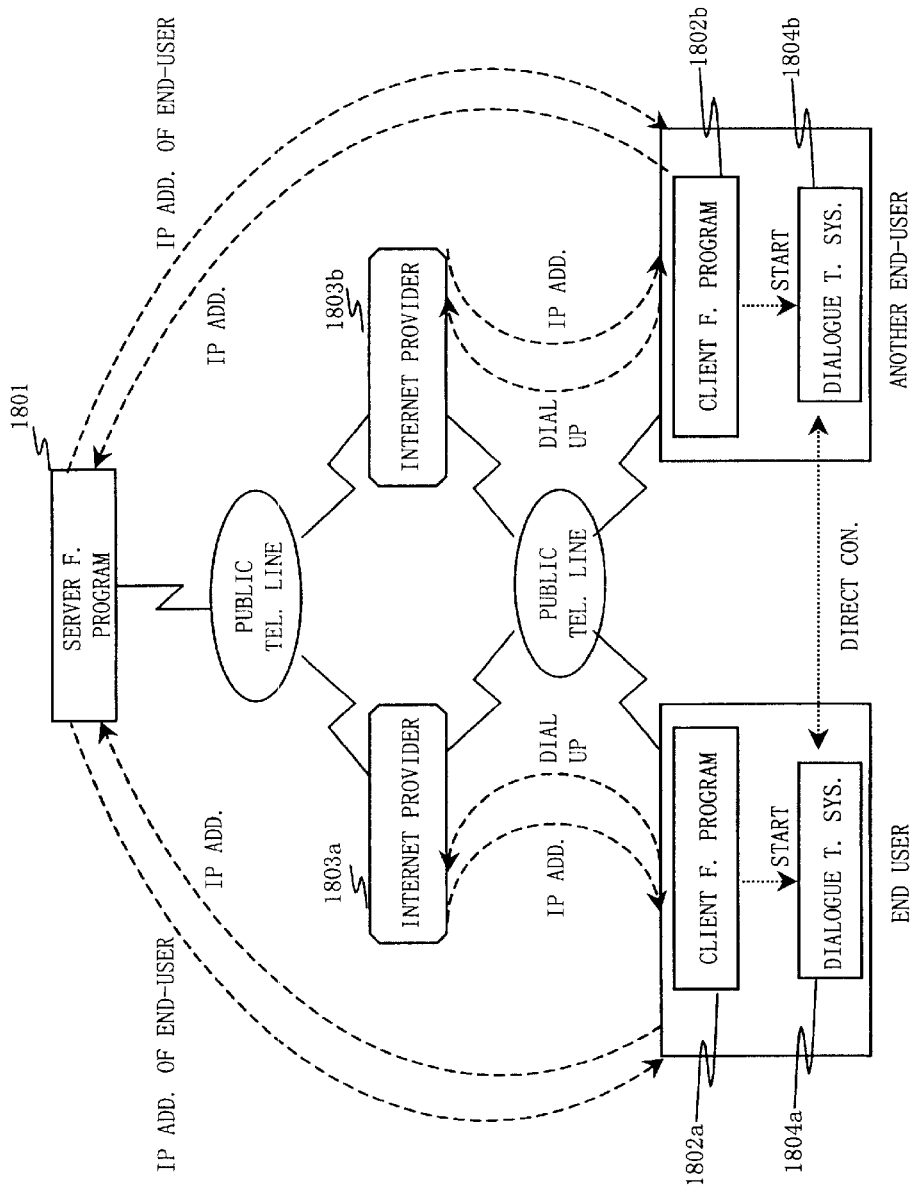
FIG. 18 illustrates a configuration of the transmission system between the computers connected each other by dialing up according to the related art.
Figure 19:
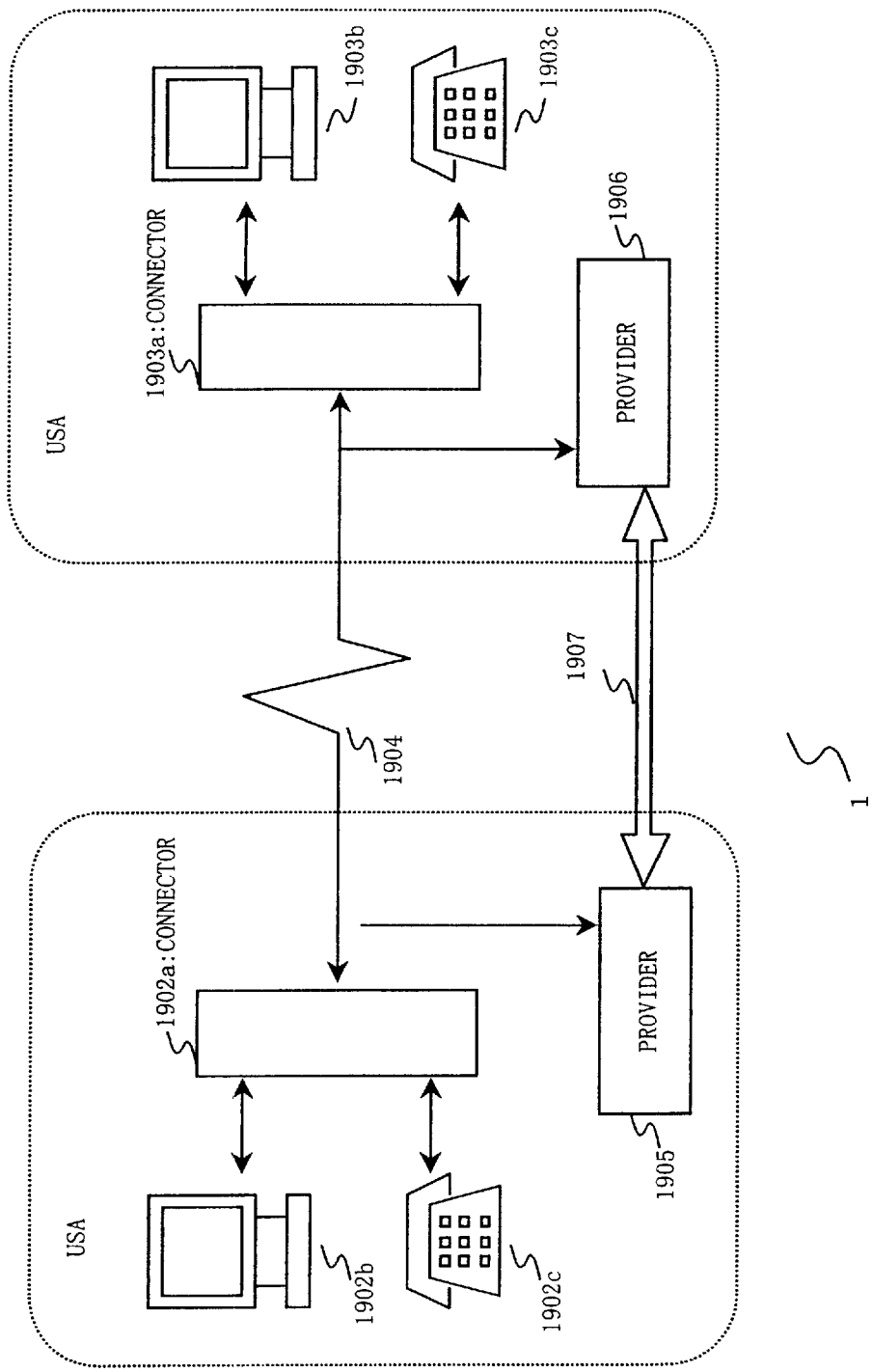
FIG. 19 illustrates a configuration of the transmission system between the computers connected each other by dialing up according to the related art.

FIG. 15 illustrates a main configuration of embodiment 7. The embodiment 7 includes the configuration of FIG. 1. However, in FIG. 15, the elements which are not necessary for the explanation of embodiment 7 are omitted to simplify FIG. 15 for better understanding of the characteristics. FIG. 16 shows a flow chart of the processing by the system for controlling the data transfer in embodiment 7.

In FIG. 15, a response setter 305*a* sets a number of the transfer for issuing the arrival confirmation message transferred for the data transfer from the sending computer.

An internal operation of the receiving computer 100*b* in embodiment 7 is explained with reference to FIG. 15.

The application 103*a* in the sending computer 100*a* requests the data transfer processor 300*a* to connect for performing the data transfer. The data transfer processor 300*a*, which has received the request for connecting, extracts past transmission history information from the connection information storage 107*a*. The transmission history information includes the packet size of the data which could be sent and received continuously and a number of transmission and receipt. The response setter 305*a* in the data transfer processor 300*a* sets a number Na of the transfer for issuing the arrival confirmation message to the sending computer (step S1611). (For example, when one arrival confirmation message is returned for three transmissions of the packet, Na=3.)

Then, the request for connecting is issued to the receiving computer together with the above set number Na (step S1612).

When the data transfer processor 300*a* in the sending computer 100*a* receives a connection completion message from the receiving computer 100*b*, the data transfer processor 300*a* registers a number Nb of the transfer for issuing the arrival confirmation message to the receiving computer, which is received together with the connection completion message, in the data sender—receiver 301*a* (step S1613).

The receiving computer 100b becomes a connection receiving condition for receiving a request for connecting from the sending computer 100a. The data transfer processor 300b extracts the past transmission history information from the connection information storage 107b, and the response setter 305b sets the number Nb of the transfer for issuing the arrival confirmation message to the receiving computer as in the sending computer 100a (step S1621).

Then, the number Na of the transfer for issuing the arrival confirmation message to the sending computer is received together with the request for connecting from the sending computer, and registered in the data transfer processor 300b (step S1622).

Finally, when the connection is completed, the number Nb of the transfer for issuing the arrival confirmation message to the receiving computer, which was set in step S1621, is sent back to the sending computer (step S1623).

In the computer system for controlling the data transfer, the receiving data transferor omits sending of the arrival confirmation message in N−1 time receiving of the packet among N (N is an integer, which is 1 or more) time receiving of the packet. The sending data transferor omits judging receipt of the arrival confirmation message in N−1 time sending of the requested data among N time sending of the packet, and re-sending the request time for N time as the re-sending packet in case that the arrival confirmation message is not received.

In the computer system for controlling the data transfer, the sending computer system includes a transmission history information memory for storing transmission history information, a response setter for determining the number N based on the transmission history information stored in the transmission history information memory, and a number N sender for sending the determined number N to the receiving computer system. The receiving computer system includes a number N receiver for receiving the number N from the sending computer system, and a number N memory for storing the received number N.

As stated, in embodiment 7, for the transmission of the requested data, the number of the transfer for issuing the arrival confirmation message is controlled based on the past transmission history information. Therefore, the transmission time necessary for transmitting the arrival confirmation message can be reduced. Hence, a total transmission processing ability can be improved.

Embodiment 8

In embodiment 7, the number of the transfer for issuing the arrival confirmation message sent back from the receiving computer 100b was set based on the past history information. However, in embodiment 8, a priority shown in FIG. 17 is specified to set a number of the transfer for issuing the arrival confirmation message.

In step S1611 in embodiment 7, the application 103a in the sending computer 100a sets a priority of the arrival confirmation message for issuing the request for connecting to the receiving computer 100b. The priority is sent to the receiving computer 100b.

When the receiving computer 100b becomes a connection request receiving condition from the sending computer 100a in step S1621 in embodiment 7 the receiving computer 100b also sets a priority of the arrival confirmation message. When there is a request for connecting from the sending computer 100a, a response setter 305b of the data transfer processor 300b in the receiving computer 100b registers the number of the transfer for issuing the arrival confirmation message obtained from the priority received from the sending computer 100a based on an arrival confirmation setting table 1700. For example, when the priority is set as one, the receiving computer 100b returns the arrival confirmation message in every time when there is the data transfer from the sending computer 100a.

Finally, the priority of the arrival confirmation message to the receiving computer 100b is sent together with a connection completion notice to the sending computer 100a. When the data transfer processor 300a in the sending computer 100a receives the priority of the arrival confirmation message, the data transfer processor 300a registers the number of the transfer for issuing the arrival confirmation message to the receiving computer 100b as in the receiving computer 100b.

As stated, in embodiment 8., when the computers 100a and 100b are connected, a number of the arrival confirmation message transferred for the data transfer can be specified by setting the priority based on the importance of the transferred data, ability of the Internet provider, and the traffic condition of the network.

According to this invention, even if the computers are disconnected due to the failure in the dial-up connection, the data transfer processor automatically restores the connection to the Internet provider and the computer, to which the data are transferred. Hence, the processing can be continued without influencing the application.

According to this invention, the provider connector automatically performs the operation for connecting to the Internet provider. Therefore, even if the connection to the disconnected the provider, which was connected to before disconnecting is failed, the processing can be continued by connecting to the substitute provider.

According to this invention, even if the computer and the Internet provider are disconnected, the request from the application can be received. When the connection is restored, the data can be sent to the receiving computer consecutively.

According to this invention, even if the failure is occurred in the network during the transfer of the requested data between the computers, the data can be resent by using the arrival confirmation message from the receiving computer.

According to this invention, even if the failure is occurred in the network while the arrival confirmation message for the data transfer between the computers is returned, the receiving computer can judge if the redundant requested data resent from the sending computer should be received, and delete the receiving data if necessary.

When the data are transferred between the computers, even if the data are in a big size, the failure in the network and the loss of the packet can be prevented by dividing the data into the small packets.

The number of the transfer for issuing the arrival confirmation message transferred for the transmission of the requested data is controlled based on the past transmission history information. Therefore, the transmission for sending the arrival confirmation message can be reduced. Hence, the total ability of the transmission processing can be improved.

Having thus described several particular embodiments of the invention, various alterations, modifications, and improvements will readily occur to those skilled in the art. Such alterations, modifications, and improvements are intended to be part of this disclosure, and are intended to be within the spirit and scope of the invention. Accordingly, the foregoing description is by way of example only and is limited only as defined in the following claims and the equivalents thereto.

What is claimed is:

1. A computer system for controlling a data transfer comprising:

a first computer system for connecting to the Internet by dialing up an Internet provider; and a second computer system connected to the Internet, wherein the first computer system comprises a provider connector, a first connection information memory, and a first data transferor, wherein the provider connector receives an address of the first computer system from the Internet provider at a time of dialing up the Internet provider, wherein the first connection information memory stores the received address of the first computer system, wherein the first data transferor sends the received address of the first computer system to the second computer system, wherein the provider connector receives a new address of the first computer system from the Internet provider at a time of redialing up the Internet provider, wherein the first data transferor sends an original address of the first computer system stored in the first connection information memory and the received new address of the first computer system to the second computer system, wherein the second computer system comprises a second connection information memory and a second data transferor;

wherein the second data transferor receives the original address of the first computer system from the first computer system, wherein the second connection information memory stores the received original address of the first computer system, wherein the second data transferor receives the original address of the first computer system and the new address of the first computer system, and transfers data using the received new address of the first computer system as an address of the first computer system in case that the address of the first computer system stored in the second connection information memory and the received original address of the first computer system are matched.

* * * * *